No. 891,046. PATENTED JUNE 16, 1908.
A. B. DISS.
CASTER FOR TUBULAR LEGS.
APPLICATION FILED MAR. 26, 1908.
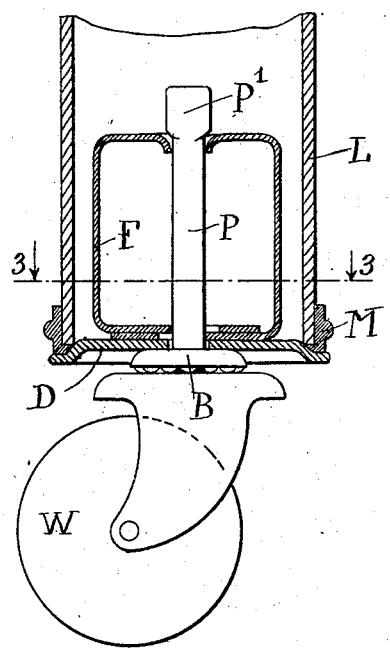
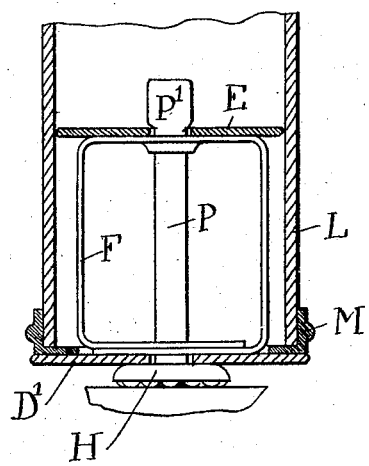
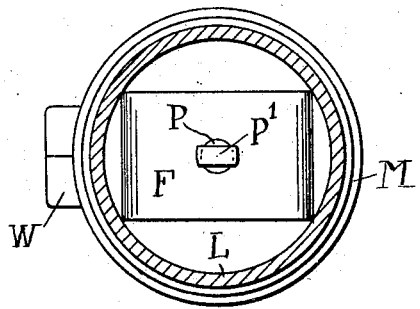
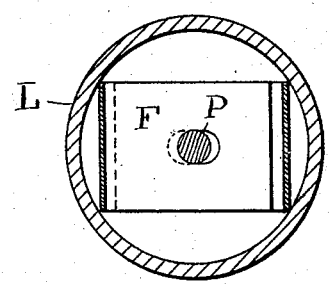
Witnesses
Herman Morris
E. Van Zandt
Inventor
Albert B. Diss
By his Attorneys
Binney & Ogden
THE NORRIS PETERS CO., WASHINGTON, D. C.

UNITED STATES PATENT OFFICE.

ALBERT B. DISS, OF NEWARK, NEW JERSEY, ASSIGNOR TO UNIVERSAL CASTER & FOUNDRY COMPANY, A CORPORATION OF NEW JERSEY.

CASTER FOR TUBULAR LEGS.

No. 891,046.  Specification of Letters Patent.  Patented June 16, 1908.

Application filed March 26, 1908. Serial No. 423,365.

*To all whom it may concern:*

Be it known that I, ALBERT B. DISS, a resident of Newark, State of New Jersey, have invented certain new and useful Improvements in Casters for Tubular Legs, of which the following is a specification illustrated by drawings.

The invention relates to the class of casters having a caster-wheel, jaws and pintle adapted to be held and centered in a relatively large tubular leg and provided with resilient means for holding the caster frictionally to the leg, so it will not drop out when the leg is raised, and for centering and supporting the pintle relatively to the leg when in use. It is customary to provide tubular legs with an ornamental collar, ring or beading around the foot of the leg and to secure the same thereto either by riveting or casting it on the leg, or in other suitable ways.

The present invention provides means for supporting and confining the leg mount in place by the caster and by the leg-supporting disk of the caster and between it and the foot of the leg in such a way that it is not necessary to secure the leg mount to the leg in any other way than by means of the same spring or spring frame that frictionally holds the caster to the leg.

The invention is of such a simple nature that it will be readily understood from the accompanying drawings, wherein Figure 1 is a side view partly in section showing the caster applied to the leg. Fig. 2 is a plan view of the same showing the leg in section. Fig. 3 is a cross section on the plane 3—3 to show the construction of the lower end of the spring frame; and Fig. 4 shows a modification.

At P is the pintle of the caster extending up through the leg-supporting disk D and spanned by the spring frame F. The leg-supporting disk rests, as is usual, upon an enlargement of the pintle which in Fig. 1 is shown as a separate ball-bearing cup B and in Fig. 4 as a similar cup H. The spring frame F may be of any preferred form, and I prefer to have it of a type which both serves to frictionally hold the caster from dropping out when the leg is raised and centers the pintle within the tubular leg near the upper and lower ends of the pintle; but other centering means may be substituted, as, for example, the disk E at the upper end of the pintle, as in Fig. 4, and at the lower end of the pintle the disk D may be dished or corrugated, as shown in Fig. 1, so as to center or assist in centering the end of the leg in respect to the pintle, or the lower end of the frame may be made to serve this function alone, as seen in Fig. 4. The form of spring frame selected for illustration is made from a strip of spring metal bent to the approximately rectangular form illustrated, and perforated so as to afford a bearing surrounding the pintle at its upper end while the lower two ends which are overlapped are perforated with elongated perforations, as seen in Fig. 3, to allow for the expansion of the frame against the inner surface of the leg to frictionally hold the caster in place when the leg is raised, yet at the same time to afford a bearing approximately fitting the pintle on all sides when the frame is thrust into the tubular leg. After the spring frame has been placed on the pintle, the end of the pintle is headed up to form a retaining head P' so the pintle cannot drop out of the frame.

The ornamental ring or leg mount M consists of the exposed outer portion that surrounds the leg and the inturned annular flange which extends beneath the foot of the leg and rests upon the leg-supporting disk D, as shown in Figs. 1 and 4. Consequently the leg mount M is confined by means of the inturned flange between the end of the leg L and the disk D or D', and the spring frame acting frictionally against the leg holds the parts in place and retains the leg mount M in its position.

In Fig. 1 the disk D is so dished or corrugated that it may touch and fit against the inner edge of the flange of the leg mount M and the inner surface of the tubular leg L thus being functioned to center the leg L relatively to the pintle P both directly and indirectly through centering the leg mount M which surrounds the leg. But if either or both these features are omitted, the spring frame may be relied upon to center the lower end of the pintle, as in the case of Fig. 4 where the plane disk D' is used. The four vertical corner edges of the frame, as plainly seen in Figs. 1 and 2, should fit snugly against the inner face of the leg, sufficient looseness only being allowed to accommodate the accidental variations in the interior of different tubular legs of the same rated size.

I make no claim to any present novelty in the spring frame F by itself, as I devised this form of spring frame with several other forms which may be used in place of it, several years ago. In my application #423,364 of even date herewith I disclose and claim a caster having generic relation to this invention and application.

What I do claim and desire to secure by these Letters Patent, is the following:

1. A caster for tubular legs having a leg-supporting disk, a pintle, an annular leg mount supported upon the disk, and comprising an inturned annular flange extending beneath the tubular leg when the caster is in use, for securing the leg mount between the leg and the disk, and an outer portion surrounding the end of the leg, and a spring frame secured on the pintle for frictionally holding the pintle within the tubular leg and the caster in place.

2. A caster having a pintle and spring means for retaining the pintle within a tubular leg, a leg-supporting disk and a leg mount which surrounds the foot of the leg and is provided with an annular inturned flange that is interposed between the foot of the leg and the disk.

3. A caster having a pintle and spring means for retaining the pintle within a tubular leg, a leg-supporting disk and a leg mount which surrounds the foot of the leg and is provided with an annular inturned flange that is interposed between the foot of the leg and the disk, the said caster having means for centering the pintle in the leg independently of the said leg mount.

In testimony whereof I have signed this specification in the presence of two subscribing witnesses, March 25th 1908.

ALBERT B. DISS.

Witnesses:
 HAROLD BINNEY,
 E. VAN ZANDT.